United States Patent
Lepretre et al.

(10) Patent No.: US 7,040,098 B2
(45) Date of Patent: May 9, 2006

(54) PROVISION OF SEALING FOR THE CABIN-AIR BLEED CAVITY OF A JET ENGINE USING STRIP-TYPE SEALS ACTING IN TWO DIRECTIONS

(75) Inventors: Gilles Lepretre, Epinay Sous Senart (FR); Bertrand Monville, Etiolles (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/928,279

(22) Filed: Aug. 30, 2004

(65) Prior Publication Data

US 2005/0061005 A1 Mar. 24, 2005

(30) Foreign Application Priority Data

Sep. 19, 2003 (FR) .................................. 03 11020

(51) Int. Cl.
 *F02C 7/20* (2006.01)
(52) U.S. Cl. ..................... 60/799; 60/796; 415/214.1
(58) Field of Classification Search ................. 60/796, 60/799, 805; 415/214.1, 213.1, 209.2
 See application file for complete search history.

(56) References Cited

U.S. PATENT DOCUMENTS

| | | | | |
|---|---|---|---|---|
| 4,798,514 | A | * | 1/1989 | Pask ........................... 415/115 |
| 5,118,120 | A | * | 6/1992 | Drerup et al. ............... 277/628 |
| 5,291,732 | A | * | 3/1994 | Halila .......................... 60/796 |
| 5,797,723 | A | | 8/1998 | Frost et al. |
| 5,848,874 | A | * | 12/1998 | Heumann et al. ........... 415/189 |
| 6,164,656 | A | * | 12/2000 | Frost ........................... 277/312 |
| 6,347,508 | B1 | | 2/2002 | Smallwood et al. |
| 6,464,232 | B1 | * | 10/2002 | Marchi et al. .............. 277/630 |
| 6,464,457 | B1 | * | 10/2002 | Morgan et al. .......... 415/174.2 |
| 6,732,532 | B1 | * | 5/2004 | Camy et al. .................. 60/796 |
| 6,823,676 | B1 | * | 11/2004 | Conete et al. ................ 60/796 |
| 6,854,738 | B1 | * | 2/2005 | Matsuda et al. ............ 277/632 |
| 6,895,761 | B1 | * | 5/2005 | Mitchell et al. .............. 60/796 |

FOREIGN PATENT DOCUMENTS

| | | |
|---|---|---|
| FR | 2 649 463 A1 | 1/1991 |
| FR | 2 825 785 A1 | 12/2002 |
| FR | 2 829 796 A1 | 3/2003 |

\* cited by examiner

*Primary Examiner*—William H. Rodriguez
(74) *Attorney, Agent, or Firm*—Oblon, Spivak, McClelland, Maier & Neustadt, P.C.

(57) ABSTRACT

The invention relates to the sealing of the cavity from which air is bled off to the cabin, which cavity is delimited, on the one hand, by the external shell of the compressor and an annular structure connected to the shell, and, on the other hand, by the external casing of the diffuser grating and a strut connected to said external casing and to an external engine casing shell fastened to the annular structure. A first seal is fitted in a first groove provided around the upstream part of the external casing of the diffuser grating, the strips of this first seal bearing on the downstream end of a first projection integral with the annular structure. A second seal is fitted in a second groove provided under said annular structure, the strips of this second seal bearing on the downstream end of a second projection integral with said annular structure and on the end of a third projection formed on the upstream part of the external casing of the diffuser.

4 Claims, 4 Drawing Sheets

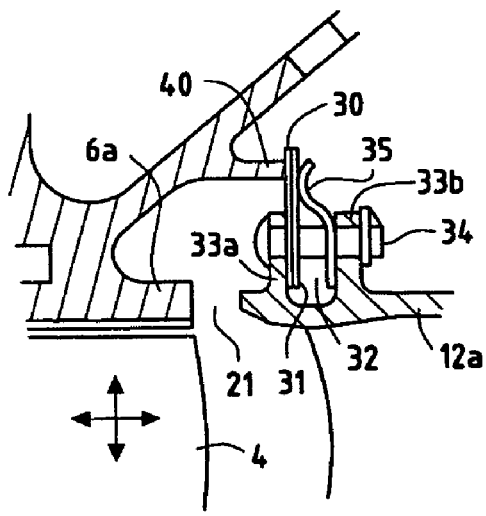
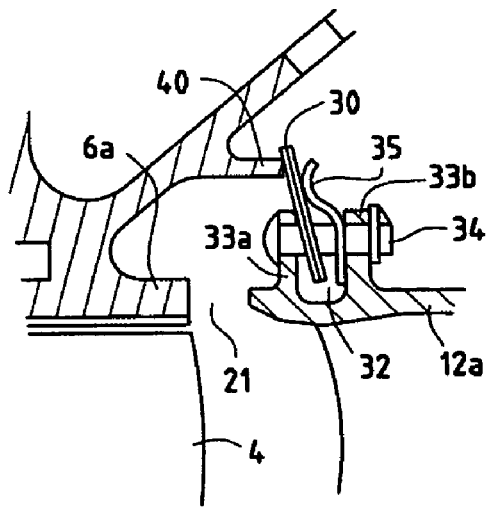
FIG.2
PRIOR ART
FIG.3
PRIOR ART
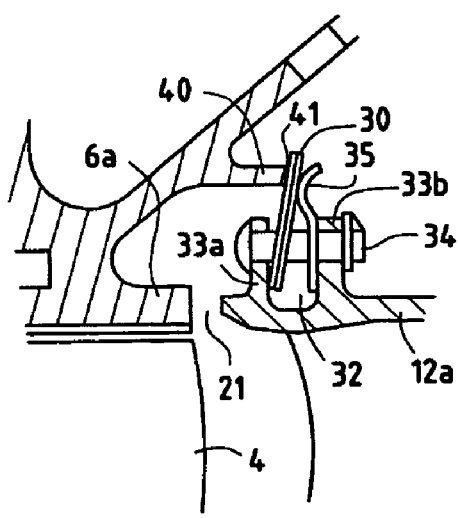
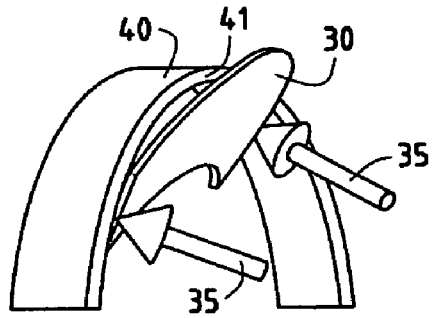
FIG.4
PRIOR ART
FIG.5
PRIOR ART

PROVISION OF SEALING FOR THE CABIN-AIR BLEED CAVITY OF A JET ENGINE USING STRIP-TYPE SEALS ACTING IN TWO DIRECTIONS

BACKGROUND OF THE INVENTION

The invention relates to a jet engine comprising, from upstream to downstream (the upstream and downstream directions being defined by the direction of circulation of the primary flow), a high-pressure compressor, a diffuser grating and a combustion chamber, said high-pressure compressor comprising an external shell which radially delimits the duct for said primary flow and is connected to an annular structure extending radially outward, said diffuser grating comprising in the axial continuation of said external compressor shell an external casing connected to a rearwardly oriented conical strut delimiting, upstream, the end of said combustion chamber, said strut itself being connected to an external casing shell which extends in the upstream direction and is fastened to said annular structure by fastening means, said strut, said external casing shell and said annular structure defining a cavity around said diffuser grating, air bleed orifices being made in said strut in order to bring the end of the combustion chamber into communication with said cavity, said external casing shell being equipped with outlet vents for the bled air, and sealing means being provided between said annular structure and said external diffuser grating casing in order to isolate said cavity from the duct for the primary flow.

DISCUSSION OF THE BACKGROUND

Air required for the cabin of the airplane equipped with at least one jet engine is bled off at the end of the combustion chamber in a region where it has the least disruptive effect on the overall efficiency of the engine. Bleeding takes place through the orifices in the strut, which makes it easy to install the outlet vents for the bled air. This arrangement requires relative sealing between the duct of the high-pressure compressor and the cavity situated above the grating of the diffuser.

This sealing is all the more difficult to achieve because the relative displacements between the diffuser grating and the external shell of the compressor are of the order of 1.5 mm in the axial direction and substantially of the same order in the radial direction, owing to the thermal and mechanical responses of the various components in an environment subjected to high pressures which may reach 30 bar and to high temperatures which may reach 650° C.

The current technology adopted to provide sealing between the compressor and the external casing of the grating is of the type comprising a seal made up of a strip and counterseal with springs pressing against these. This technology in fad allows a sufficiently large displacement between the two components.

The prior art is illustrated by FIG. 1, which shows the last stage of a high-pressure compressor 1 of a jet engine having, from upstream to downstream in the direction of the primary flow F1, a ring of fixed vanes 2 extending radially inward from an external casing 3, followed by a ring of moving blades 4 mounted at the periphery of a compressor wheel 5 and extending outward as far as an external compressor shell 6 which, together with the external casing 3, radially delimits the duct for the primary flow, this external shell 6 being connected to an annular structure 7 which has a V-shaped cross section in the plane containing the axis of the jet engine, extends radially outward and is fastened to the external casing of the engine by bolting.

Provided downstream of the compressor 1 is a diffuser grating 10 which receives the compressed air from the compressor 1 and delivers it toward a combustion chamber 11. In the axial continuation of the external shell 6 of the compressor 1, the grating 10 has an external casing 12 connected to a conical strut 13 oriented toward the rear of the jet engine, this strut 13 defining the upstream wall of the end of the combustion chamber 11 and being connected in its radially outer region to an external casing shell 14 which extends in the upstream direction and has an upstream flange 15 by means of which the assembly consisting of the combustion chamber and the diffuser can be fastened on a radially outer flange 16 of the annular structure 7 by bolting.

A cavity 20 surrounding the diffuser grating 10 is thus delimited axially by the annular structure 7 and the strut 13, radially outwardly by the external casing shell 14 and radially inwardly by the downstream portion 6a of the external compressor shell 6 and by the upstream portion 12a of the external casing 12, a gap 21 separating these two portions.

The strut 13 has air bleed orifices 22 at the end of the combustion chamber and the external casing shell 14 is equipped with outlet vents 23 to supply a flow of air for aerating the cabin of the airplane or for cooling other elements of the jet engine.

Sealing between the compressor duct and the cavity 20 is achieved, as is shown in detail in FIG. 2, by a sectorized seal made up of strips 30 lined with counterseals 31, this seal being mounted on the periphery of the upstream portion 12a of the external casing 12 of the diffuser grating. To this end, this upstream portion 12a has over its periphery a channel 32 delimited by two flanges, the upstream one having the reference 33a and the downstream one having the reference 33b, which flanges have holes drilled into them for fastening rivets 34. The strips 30 and the counterseals 31 are kept in bearing contact with the downstream face of the upstream flange 33a by means of springs 35 and are retained by the rivets 34. The springs 35 are likewise retained by the rivets 34. The radially internal portion of the annular structure 7 has an annular projection 40 which extends axially into the cavity 20 and the end of which is situated above the upstream flange 33a in the absence of any axial displacement between the external shell 6 of the compressor 1 and the external casing 12 of the diffuser, as is shown in FIG. 2.

The springs 35 bear on the seals in the annular region separating the projection 40 from the upstream flange 33a. Moreover, the air pressure in the cavity 20 is slightly greater than the pressure in the duct at the gap 21.

The bearing points for the seals 30 on the projection 40 side and on the upstream flange 33a side have convex surfaces. The combined forces of the springs 35 and the pressure difference across the two faces of the seals 30 press the strips 30, which are flat, against these surfaces in the configuration shown in FIG. 2, thus providing sealing.

In certain flight phases, the bearing between the strips 30 and the projection 40 leaves an escape clearance, especially when the projection 40 passes above the channel 32, as is shown in FIGS. 4 and 5. Between two consecutive springs, the strips 30 move away from the projection and only the pressure difference between the two faces, which is small, may prevent the creation of this separation. An escape clearance 41 is then formed between the strips and the end of the projection 40.

When, by contrast, the diffuser grating 10 moves away from the compressor 1, as can be seen in FIG. 3, the force due to the pressure difference and the force of the springs 35 allow correct sealing to be achieved, by deformation of the strips 30.

The double arrows shown in FIG. 2 indicate the relative axial and radial displacements between the downstream end of the external compressor shell 6 and the upstream end of the external casing 12 of the diffuser grating 10.

It should also be noted that the arrangement of this sealing system borne by the external casing 12 makes it possible for the combustion chamber/diffuser assembly to be assembled on the compressor by relative axial displacement of said assembly with respect to the compressor and then by bolting together the external flanges 15 and 16.

SUMMARY OF THE INVENTION

The aim of the invention is to achieve perfect sealing between the cavity and the duct for the primary flow irrespective of the variations of the gap and irrespective of the air pressure difference between the two faces of the sealed region.

The invention achieves its aim by virtue of the fact that the sealing means comprise a first seal and a second seal of the sectorized type made up of counterseal-lined strips which are acted on by springs, said first seal being fitted in a first groove provided around the upstream part of the external casing of the diffuser grating, the strips of this first seal bearing on the downstream end of a first projection integral with the annular structure, and said second seal being fitted in a second groove provided under said annular structure, the strips of this second seal bearing on the upstream end of a second projection integral with said annular structure and on the upstream end of a third projection integral with said upstream part of the external casing.

The fact that an oppositely functioning second seal is installed makes it possible to respond to all variations of direction of the pressure difference but also reinforces the system by providing an additional passage difficulty for very small gradients owing to the existence of an airlock between the two seals.

The first groove is delimited by an upstream flange and a downstream flange, the first seal and the first springs being retained by means of rivets fastened on said flanges, and the third projection is formed on the upstream face of said upstream flange.

The annular structure comprises a rearwardly oriented, radially inner part, and the second groove is delimited by said part and a third flange situated above the upstream flange, the first projection extending in the downstream direction from the radially inner end of said third flange, this end additionally having a second projection which extends in the upstream direction and on which the second seal bears.

BRIEF DESCRIPTION OF THE DRAWINGS

Other advantages and features of the invention will emerge on reading the description below given by way of example and with reference to the appended drawings, in which:

FIGS. 1 to 5 show the prior art:

FIG. 1 being a half-section, in a plane containing the axis of the jet engine, of the downstream part of a compressor and of the diffuser, which shows the layout of the cavity communicating with the end of the combustion chamber and from which air is bled for the cabin of the airplane, and the installation of the seal, according to the prior art, between this cavity and the duct for the primary flow;

FIG. 2 shows the arrangement of the seal according to the prior art on a larger scale;

FIG. 3 shows the deformation of the seal when there is an increase in the gap between the external shell of the compressor and the external casing of the grating of the diffuser;

FIG. 4 shows the deformation of this same seal when there is a reduction in this gap;

FIG. 5 is a perspective view of the seal when there is a reduction in the gap, which shows the escape clearance;

DESCRIPTION OF THE PREFERRED EMBODIMENTS

FIGS. 1 to 5 depicting the prior art have been described in detail in the introduction of the present document and do not require any further explanations.

Figure 1:
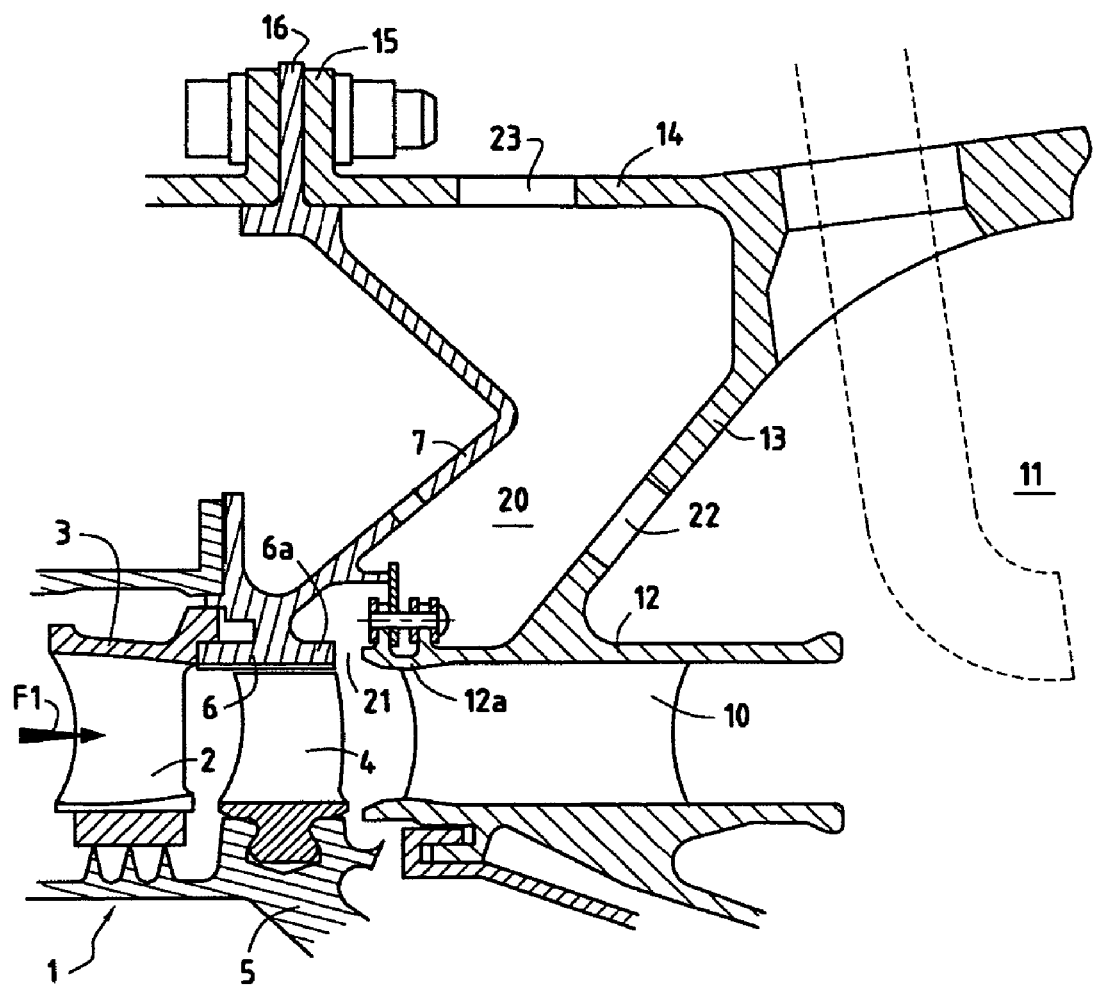
Figure 6:
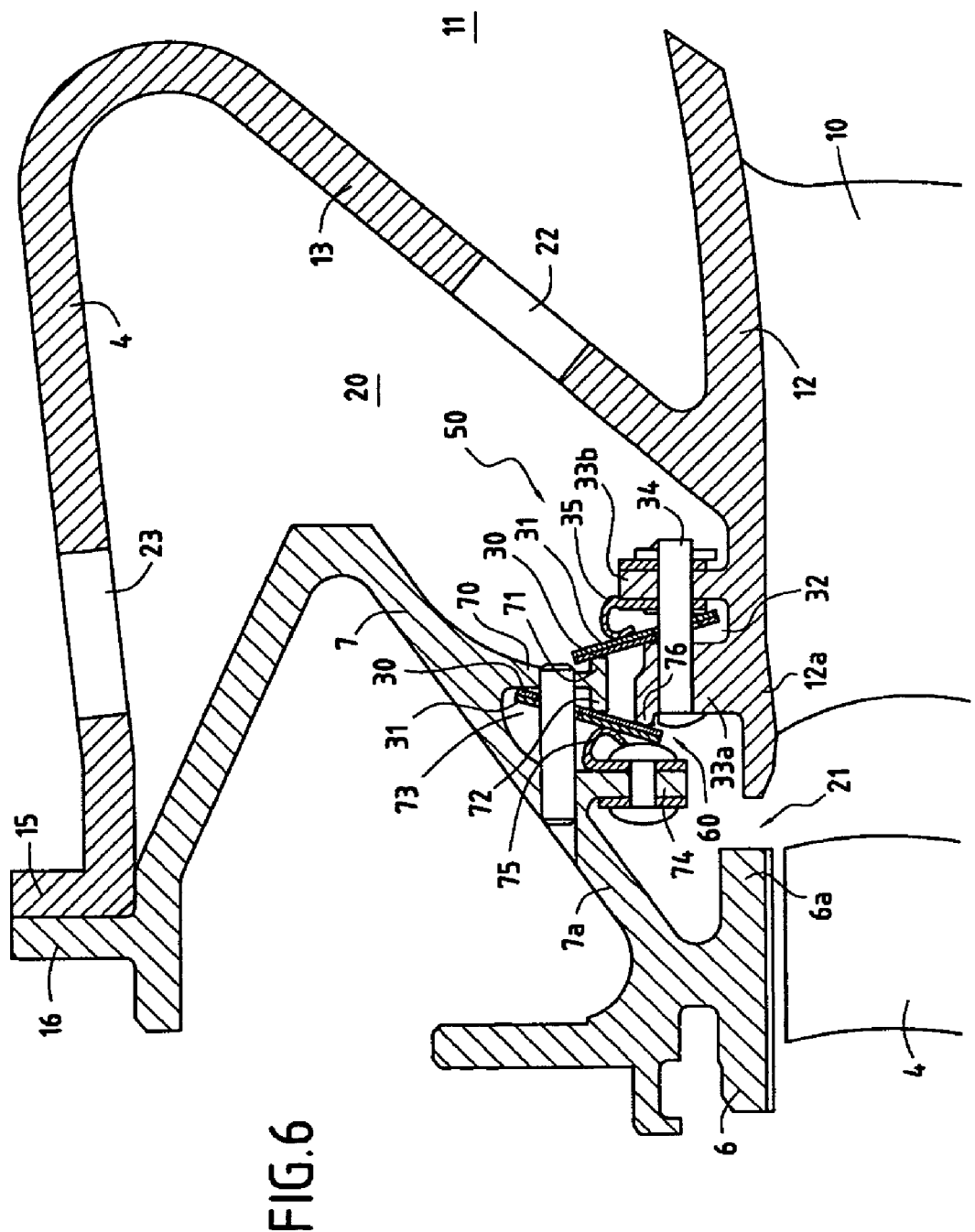
FIG. 6 shows the sealing system proposed by the invention to isolate the bleed cavity from the duct for the primary flow.

FIG. 6 shows the sealing system proposed by the invention to isolate the cavity 20 from the duct for the primary flow F1. In this figure, the various elements delimiting the cavity 20 bear the same references as the identical elements of FIGS. 1 to 5.

The sealing system comprises a first seal 50 mounted at the periphery of the upstream portion 12a of the external casing 12 of the diffuser grating 10, this first seal being similar to that of the prior art illustrated in FIG. 2, and a second seal 60 situated upstream of the first seal 50, likewise of the strip type, and borne by the radially inner part 7a of the annular structure 7 of the compressor.

To this end, this part 7a which extends substantially parallel to the strut 13 has, above the upstream flange 33a, a third flange 70 which extends radially inward and the radially inner end of which has a first projection 71 which extends in the downstream direction and a second projection 72 which extends in the upstream direction.

The strips 30 of the first seal 50 bear on the free end of the first projection 71. These strips are retained in the groove 32 separating the upstream flange 33a from the downstream flange 33b by means of rivets 34 and bear on the downstream face of the upstream flange 33a and on the free end of the first projection 71 by virtue of the springs 35, which are likewise retained by the rivets 34 and bear on the upstream face of the downstream flange 33b.

The third flange 70 delimits, together with the part 7a of the annular structure, a channel 73 having the same function as the groove 32. Pins borne by the third flange 70 retain the radially external regions of the strips 30 and counterseals 31 of the second seal 60.

The part 7a also comprises, upstream of the third flange, lugs 74 which serve to keep second springs 75 in place by riveting, these second springs exerting forces on the counterseals 31 and strips 30 of the second seal 60 so that these strips bear not only on the upstream end of the second projection 72 but also on a third projection 76 formed at the periphery of the upstream face of the upstream flange 33a.

The two seals 50 and 60 described above each act like the seal of the prior art described in FIGS. 1 to 5 but in opposite directions.

To prevent one of these seals from adopting the configuration shown in FIGS. 4 and 5, the extent of the first projection 71 and second projection 72 is such that these projections are always arranged above the upstream flange 33a irrespective of the relative axial displacements of these two elements during operation. In other words, the distance separating the ends of the first projection 71 and of the second projection 72 is less than the thickness of the upstream flange 33a increased by the length of the third projection 76.

Figure 7:
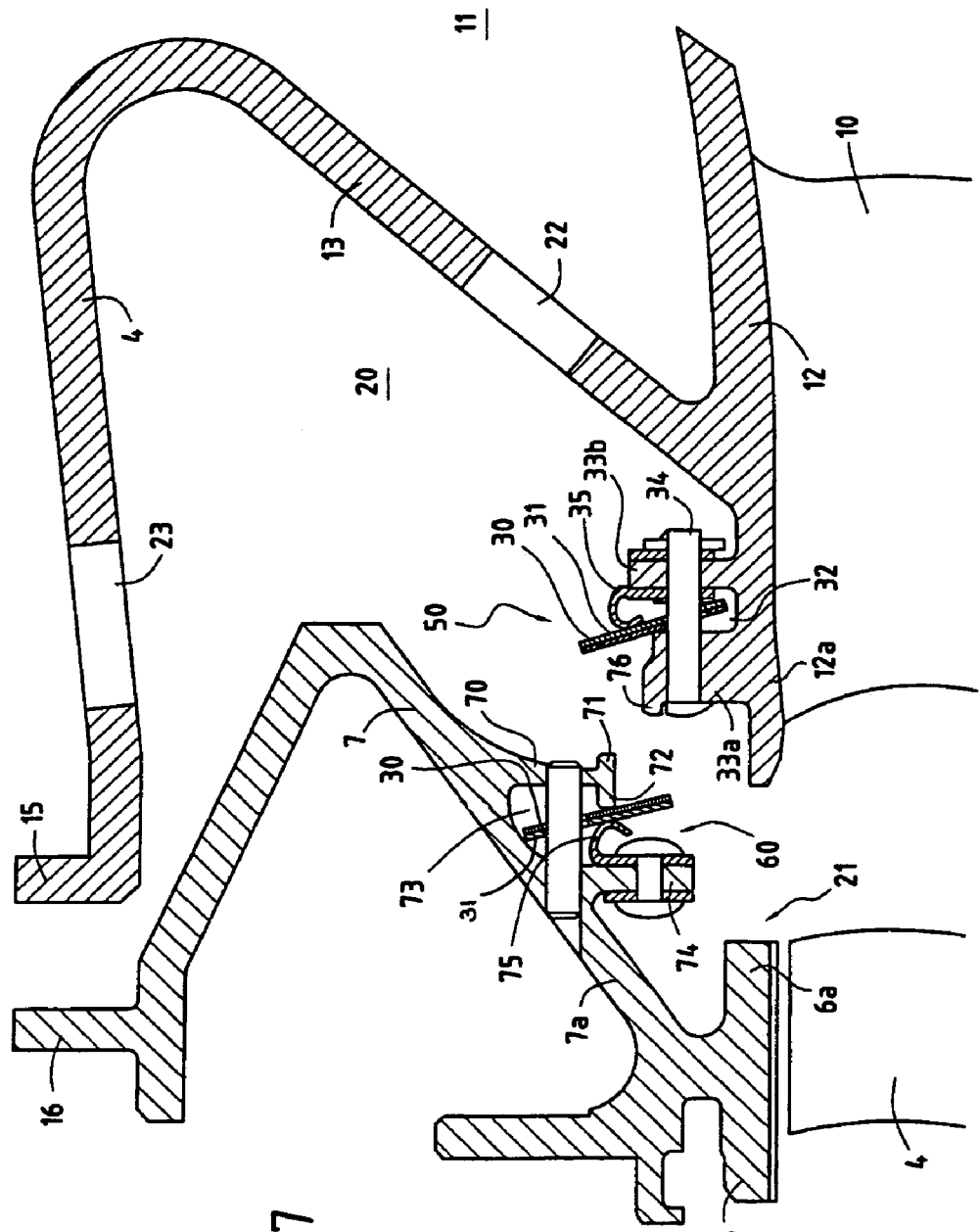
FIG. 7 shows the way of fastening together the body of the compressor and the diffuser/combustion chamber assembly.

FIG. 7 shows the arrangement of the first seal 50 on the assembly consisting of the diffuser and the combustion chamber and the arrangement of the second seal on the compressor prior to these two components being assembled.

These two components are arranged axially at a distance from one another so that by bringing them axially toward one another, the first seal 50 comes to bear on the first projection 71 and the second seal 60 comes to bear on the third projection 76. When the flange 16 of the annular structure 7 and the flange 15 of the external casing shell 14 are in a position alongside one another, it is possible to fasten them by bolting. The assembly is thus carried out "blind".

The invention claimed is:

1. A jet engine comprising, from upstream to downstream (the upstream and downstream directions being defined by the direction of circulation of the primary flow), a high-pressure compressor, a diffuser grating and a combustion chamber, said high-pressure compressor comprising an external shell which radially delimits a duct for said primary flow and is connected to an annular structure extending radially outward, said diffuser grating comprising in the axial continuation of said external compressor shell an external casing connected to a rearwardly oriented conical strut delimiting, upstream, an end of said combustion chamber, said strut itself being connected to an external casing shell which extends in the upstream direction and is fastened to said annular structure by fastening means, said strut, said external casing shell and said annular structure defining a cavity around said diffuser grating, air bleed orifices being made in said strut in order to bring the end of the combustion chamber into communication with said cavity, said external casing shell being equipped with air bleed vents, and sealing means being provided between said annular structure and said external diffuser grating casing in order to isolate said cavity from the duct for the primary flow, wherein the sealing means comprise a first seal and a second seal of the sectorized type made up of counterseal-lined strips which are acted on by springs, said first seal being fitted in a first groove provided around an upstream part of the external casing of the diffuser grating, the strips of this first seal bearing, under the action of first springs, on a downstream end of a first projection integral with the annular structure, and said second seal being fitted in a second groove provided under said annular structure, the strips of this second seal bearing, under the action of second springs on an upstream end of a second projection integral with said annular structure and on an upstream end of a third projection integral with said upstream part of the external casing.

2. The jet engine as claimed in claim 1, wherein the first groove is delimited by an upstream flange and a downstream flange, the first seal and the first springs being retained by means of rivets fastened on said flanges, and the third projection is formed on an upstream face of said upstream flange.

3. The jet engine as claimed in claim 2, wherein the annular structure comprises a rearwardly oriented, radially inner part, and the second groove is delimited by said part and a third flange situated above the upstream flange, the first projection extending in the downstream direction from a radially inner end of said third flange, said radially inner end additionally having the second projection which extends in the upstream direction and on which the second seal bears.

4. The jet engine as claimed in claim 3, wherein the second springs are fastened to lugs formed on said annular structure independently of the fastening by means of pins of the strips and counterseals of the second seal in the second groove.

\* \* \* \* \*